United States Patent [19]
Barbic et al.

[11] Patent Number: 4,867,655
[45] Date of Patent: Sep. 19, 1989

[54] VARIABLE STIFFNESS OIL FILM DAMPER

[75] Inventors: John R. Barbic, Tequesta, Fla.; Kurt L. Nichol, Estill Springs, Tenn.; David H. Hibner, Ashford; David R. Szafir, Ellington, both of Conn.

[73] Assignee: United Technologies Corporation, Hartford, Conn.

[21] Appl. No.: 167,754

[22] Filed: Mar. 14, 1988

[51] Int. Cl.[4] .......................... F04B 17/00; F16C 39/04
[52] U.S. Cl. ..................................... 417/407; 60/39.08; 384/99; 384/535
[58] Field of Search .................. 417/407; 384/99, 535, 384/581; 60/39.08

[56] References Cited
U.S. PATENT DOCUMENTS
4,669,893 7/1987 Chalaire et al. .................. 384/99

Primary Examiner—Carlton R. Croyle
Assistant Examiner—Timothy S. Thorpe
Attorney, Agent, or Firm—Norman Friedland

[57] ABSTRACT

The critical speed of a bearing supported rotating shaft is changed or controlled by dimensioning the oil squeeze film damper so that the volumen of oil is selected to produce a spring rate that when added to the mechanical spring rate will attain the overall spring rate of the system. The spring rate of the oil becomes effective when the volume is at a predetermined value which is at a level higher than heretofore known oil squeeze film dampers.

6 Claims, 3 Drawing Sheets

VARIABLE STIFFNESS OIL FILM DAMPER

This invention was made under a Government contract and the Government has rights herein.

DESCRIPTION

1. Technical Field

This invention relates to fluid dampers for damping cyclical, transverse orbital movement of a nonrotating cylindrical body occasioned by the rotating shaft carrying the compressors and turbines of a gas turbine engine and particularly to means for varying the stiffness (spring rate) of the damper by preselecting the volume of oil to "tailor" the overall spring rate and, hence, control or change the critical speed of the rotor system.

2. Background Art

This invention constitutes an improvement over the fluid damping system of the system disclosed and claimed in U.S. Pat. No. 4,669,893 entitled "Annular Oil Damper Arrangement" granted on June 2, 1987 to Donald Chalaire, Halfen L. Hoyt and James Hurchalla, and U.S. Pat. No. 4,213,661 entitled "Bearing Support Structure Combining Fluid Damping and Spring Damping Apparatus" granted on July 22, 1980 to R. A. Marmol, both patents being assigned to United Technologies Corporation, the assignee of this patent application.

U.S. Pat. No. 4,669,893 supra, discloses and claims a fluid supply system for a fluid damper for a bearing supporting shaft of a gas turbine engine intended to control the transverse orbital movement of a nonrotating cylinder induced by the vibratory energy created by unbalance in the rotating shaft. The oil supply system consists of a reservoir completely filled with fluid used by the damper and a predetermined sized vent communicating with the reservoir to allow a predetermined amount of leakage. Oil is continuously supplied to the damper by a hydraulic pump. A sized orifice disposed between the fluid damper and the reservoir controls the volumetric flow rate of the damping fluid, maintains an elevated average static fluid pressure in the annular volume of the fluid damper and resists surge flow into the reservoir during periodic occurrence of high fluid pressure in the fluid damper.

U.S. Pat. No. 4,655,248 supra, discloses and claims a spring mounted in parallel with the fluid damper wherein the stiffness of the arcuate springs are selected so as to control the stiffness of the damper so that the critical speed of the rotating shaft is tuned to operate outside the normal operation range of the gas turbine engine.

As is exemplified by the structure disclosed in U.S. Pat. No. 4,213,661 it is of significant importance that the critical speed of the shaft carrying the turbines/compressors of a gas turbine engine is selected so that it falls at some level outside the normal operating range of the gas turbine engine. For example, from an overall range of the flight envelope, it is desirable to tune the damping system so that the critical speed is below the idle condition of the power plant. To accomplish this feature the designer is typically limited by the parameters afforded to him by the structures of the damping system. In heretofore designed fluid dampers for gas turbine engines such as the F100 manufactured by the Pratt and Whitney Division of United Technologies Corporation, the assignee of this patent application, the fluid damper consists of the fluid damper in combination with the mechanical springs which would be a spring mounted in parallel with the fluid damper and the structure housing the damper and supporting the shaft's bearings. Hence, the parameters that the designer has to work with is the spring rate of the fluid per se and the spring rates of the spring and the attendant structures. In heretofore designs and by past experience, the polarity of the spring rates of each of the elements in the entire system was positive, i.e. the reaction force of all the springs was in the sam direction, so that the designer had to limit the tuning capabilities to this criteria. This imposed certain limitation to the amount of tuning that could be built into the damping system.

DISCLOSURE OF THE INVENTION

As was noted above the variable stiffness damper consists of a high volume oil film damper centered (inner journal with respect to outer journal) by a mechanical spring. Under normal conditions, pressures (forces) developed in the oil film are small and rotor support is provided by the centering spring. When whirling imbalance loads become large, such as during a blade loss event, large pressures (forces) are generated in the oil film and the oil film stiffness becomes significant. We have found that the angular position of the resultant pressure (force) vector with respect to the displacement (line of centers) can be influenced by the volume of oil in the damper. This is a function of the mass (inertial properties) of the oil. When the resultant force vector is positioned greater than 90 degrees from the line of centers the force component acting along the line of centers (spring force) is in the direction of the displacement and becomes a negative spring force. As used herein, the phrase "negative spring force" defines the polarity of the force as being opposite to the mechanical spring force. Because this stiffness is generated by the oil film, its characteristics are nonlinear and become a function of the amount of dynamic load being input to the damper. Dynamic loads are further influenced and amplified as a rotor critical speed is encountered. Since the critical speed is a function of rotor support stiffness, its location in the speed range will be influenced by the stiffness of the oil film in the damper. If the centering spring spring rate is properly set, its mechanical spring rate will oppose the oil film spring rate resulting in a reduced system spring rate. This will lower the critical speed since these two springs are in parallel. In this way, it becomes possible to control/change the location of a critical speed in the speed range avoiding a peak rotor resonant condition.

A feature of this invention is to provide an improved oil film damping system for the compressor/turbine shaft of a gas turbine engine.

A still further feature of this invention is to judiciously select the volume of oil in an oil film damper for the shaft of a gas turbine engine so as to vary the overall stiffness of the damper to control or change the location of the critical speed of the rotating shaft.

A still further object of this invention is to increase the gap between the nonrotating members adjacent the oil film of the oil film damper so as to judiciously increase the volume of oil therebetween in order to obtain an oil film spring force that opposes the mechanical support spring force so as to decrease the system's spring rate and lower the critical speed below the rotational speed of the compressor/turbine shaft of a gas turbine engine.

The foregoing and other features and advantages of the present invention will become more apparent from the following description and accompanying drawings.

BEST MODE FOR CARRYING OUT THE INVENTION

Figure 1:
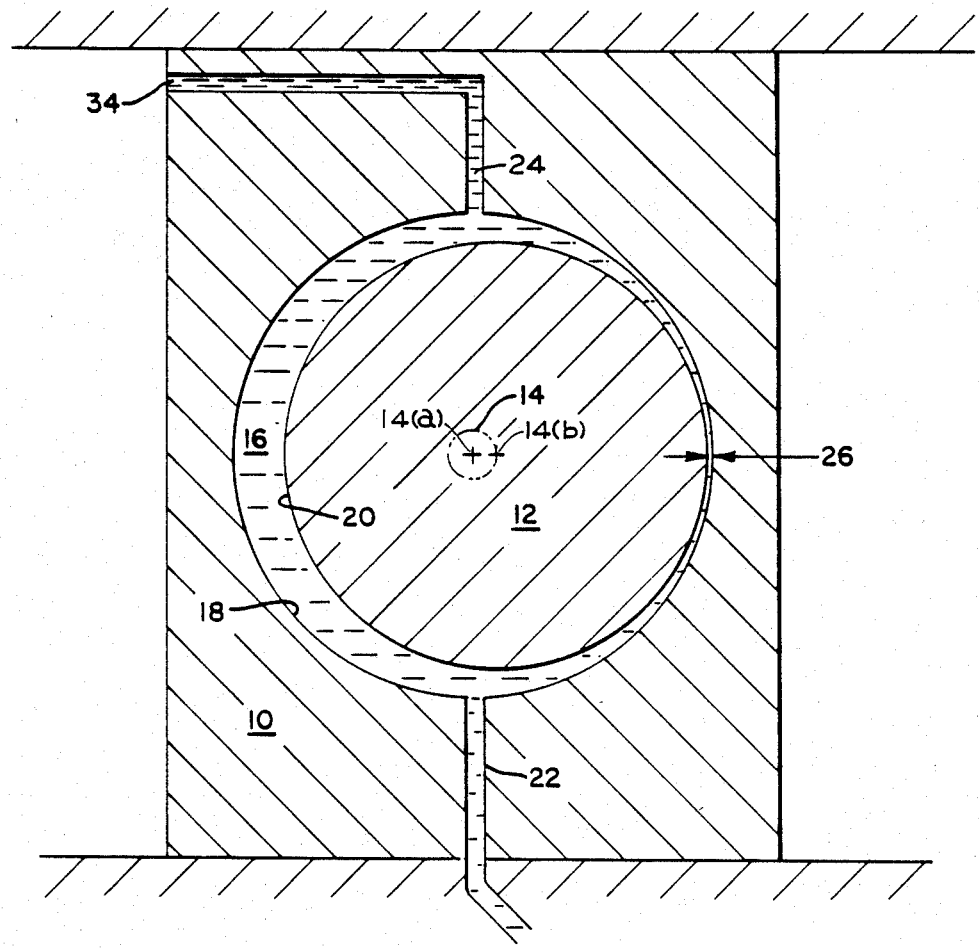
FIG. 1 shows a cross sectional view normal to the axis of rotation of an annular damper and a schematic of the oil supply system according to the present invention.

Reference is made to FIG. 1 which shows a portion of a typical fluid damper comprising support housing 10 disposed about a cylindrical internal member 12 which is subject to attempted cyclical orbital motion 14. Cylindrical member 12 is the nonrotating bearing sleeve, hereinafter referred to as the sleeve 12. A flow of damping fluid is introduced into the annular volume 16 formed between the inner surface 18 of the support member 10 and the outer surface 20 of the sleeve 12 via supply conduit 22.

The fluid fills the annular volume 16, eventually exiting through a vent opening 24 also disposed in the support 10. During operation, the damper thus described absorbs the momentum of the sleeve 12 through viscous and hydrodynamically created forces resulting from the presence of the damping fluid in the annulus 16.

As is well known, the orbital motion 14 of the sleeve 12 causes a circumferential pressure wave to be propagated around the support member surface 18 in advance of the orbiting line of closest approach 26 between the sleeve 12 and the support 10. The local fluid pressure reaches a maximum within the circumferential pressure wave (FIGS. 3A and 3B) which when resolved into component forces produces a damping force that opposes the orbiting motion and a spring force that may be in the same or opposite direction of the spring force of the mechanical support 48. A local region of relatively low pressure also trails the sleeve 12. This is identified as the cavitation region on FIGS. 3A and 3B. The continuous supply of the fluid within the annulus 16 from supply conduit 22 is essential to the continued operation of such dampers. Fluid from the damper is vented through restriction 24 and vent 34 where it is collected and recirculated through a sump pump (not shown).

Figure 2:
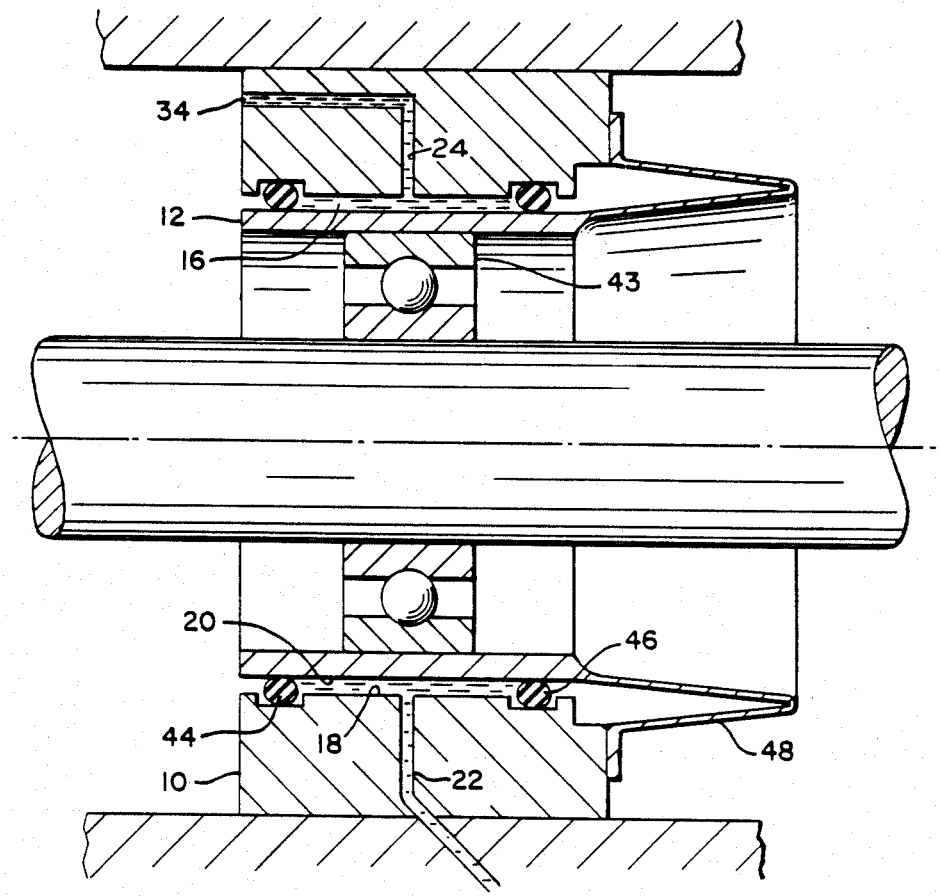
FIG. 2 shows a longitudinal cross sectional view of the damper and a similar schematic as that illustrated in FIG. 1 according to the present invention.

FIG. 2 shows a sectional view of the damper of the present invention taken in the plane of the central shaft axis. The annular volume 16 is shown between the cylinder surface 2h and the inner surface 18 of the support member 10. Longitudinal flow of damping fluid from the volume 16 is prevented by longitudinal seals such as elastomeric O-rings 44, 46. Also shown is an annular spring flange 48 secured between the sleeve 12 and the support member 10 for holding the sleeve 12 against longitudinal displacement while allowing relatively free radial movement.

The annular volume 16 is thus defined by a fluid-tight, inflexible structure. The only fluid flow paths to or from the volume 16 are as defined by the vent opening 34 and the supply conduit 22.

Figure 3A:
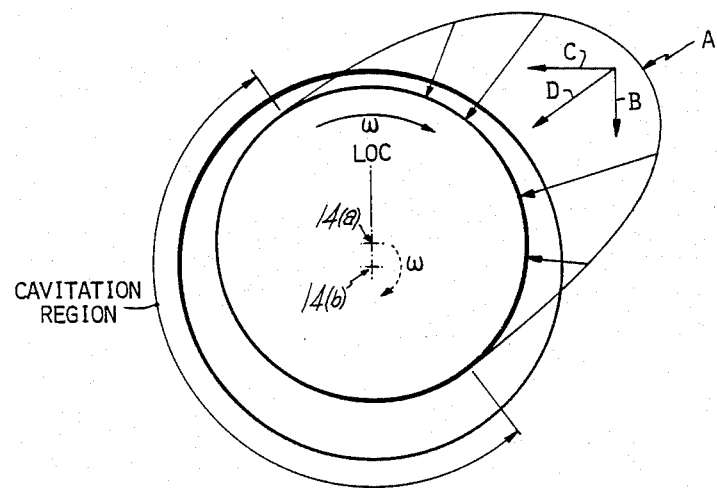
FIGS. 3A and 3B graphically illustrate the pressure pattern of the fluid at a given point of operation of the fluid damper when the heretofore designed system 3A and the increased volume system 3B are at peak pressure and the lines of center are in alignment.

As can best be seen by referring to FIGS. 3A and 3B, when the lines of centers 14(a) and 14(b) are aligned at the point of time during the operation of the dampers when the pressure is at its peaked value, the lines of pressure or pressure pattern can be drawn as illustrated by reference letter A and A'. The oil spring force and oil damping force can be vectorily resolved (arrow D) as illustrated by referenced arrow B and C. As is apparent from the foregoing the illustration in FIG. 3A shows that the resultant reaction force represented by arrow D is in what will be defined as the "positive" direction. This is, in fact, in the same direction as the spring force of the mechanical spring and the supporting structure.

Figure 3B:
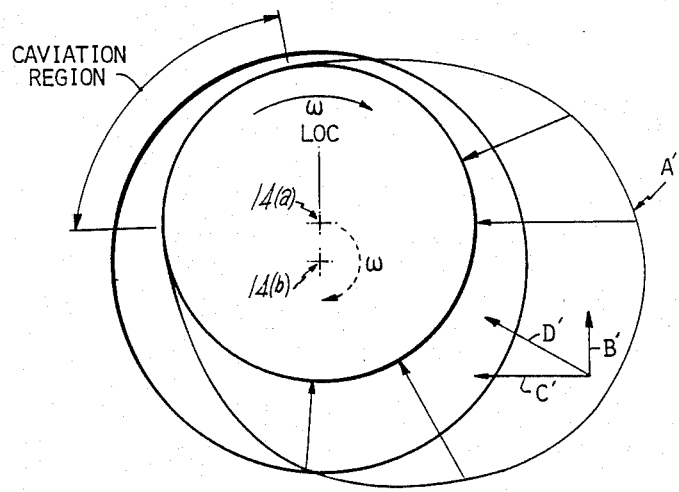

Next, observing FIG. 3B at the very same condition when the volume of oil in space 16 has increased, which in actual design been increased by changing the gap from 0.010 to 0.030, the resultant oil damping force (C') still opposes the whirl motion but the oil spring force (B') opposes the mechanical spring and the supporting structure, thus the term "negative" spring force. The negative spring force thus reduces the system spring rate.

Hence, this feature affords the designer an entirely new spectrum to work in as he has now the opportunity to select either a positive or negative value of the oil spring rate which expands the range of change of the shaft's critical speed.

Although this invention has been shown and described with respect to detailed embodiments thereof, it will be understood by those skilled in the art that various changes in form and detail thereof may be made without departing from the spirit and scope of the claimed invention.

We claim:

1. Means for controlling the critical speed of a high speed rotating shaft supported by bearings, said means including a fluid squeeze film damper comprising a nonrotating cylindrical sleeve having a center line disposed within a surrounding support member also having a center line, a fluid-tight annular volume defined between the outer surface of said nonrotating cylindrical sleeve and the inner surface of said surrounding support member, the outer surface of said cylindrical sleeve and the inner surface of said support member defining a gap having a given radial thickness, means including a fluid supply line for conducting fluid from a pressurized source to said fluid-tight annular volume, said fluid squeeze damper having a system,s spring rate comprising a mechanical spring rate whose value is predetermined by the cylindrical sleeve, surrounding support member and the bearing, and a spring rate developed by the fluid in said fluid-tight annular volume, the dimension of said gap being selected to confine a volume of fluid that produces a stiffness force that is opposite in direction than it would be when said gap dimension is below said dimension whereby said fluid produces a spring force for control the system,s spring rate so as to select a predetermined critical speed of said shaft.

2. Means as claimed in claim 1 wherein the radial thickness of said fluid-tight annulus is substantially greater than 10 mils.

3. Means as claimed in claim 1 wherein said radial thickness of said fluid-tight annulus is generally equal to 30 mils.

4. A turbine type power plant including a rotating shaft supporting a turbine and compressor in combination with means for controlling the critical speed of said rotating shaft, bearing means supporting said shaft, said controlling means including
- a fluid squeeze film damper comprising a nonrotating cylindrical sleeve having a center line disposed within a surrounding support member also having a center line and attached to said bearing means, a fluid-tight annular volume defined between the outer surface of said nonrotating cylindrical sleeve and the inner surface of said surrounding support member, the outer surface of said cylindrical sleeve and the inner surface of said support member defining a gap having a given radial thickness, means including a fluid supply line for conducting fluid from a pressurized source to said fluid-tight annular volume,
- said fluid squeeze damper having a system's spring rate comprising a mechanical spring rate whose value is predetermined by said cylindrical sleeve, said surrounding support member and bearing means, and a spring rate developed by the fluid in said fluid-tight annular volume,
- the dimension of said gap being selected to confine a volume of fluid that produces a stiffness force that is opposite in direction that it would be when said gap dimension is below said dimension whereby said fluid produces a spring force for controlling the system's spring rate so as to select a predetermined critical speed of said shaft.

5. A turbine type power plant as claimed in claim 4 wherein the radial thickness of said fluid tight, annulus is substantially greater than 10 mils.

6. A turbine type power plant as claimed in claim 4 wherein said radial thickness of said fluid-tight annulus is generally equal to 30 mils.

* * * * *

UNITED STATES PATENT AND TRADEMARK OFFICE
CERTIFICATE OF CORRECTION

PATENT NO. : 4,867,655

DATED : September 19, 1989

INVENTOR(S) : John R. Barbic, Kurt L. Nichol, David H. Hibner, David R. Szafir It is certified that error appears in the above-identified patent and that said Letters Patent is hereby corrected as shown below:

On the title page:
Element (57), line 3: after "the" change "volumen" to --volume--

Column 2, line 45: after "centering" delete "spring"

Column 4, line 53: after "having a" change "systems,s" to "system's"

Column 4, line 63: after "for" change "control" to "controlling"

Column 4, line 64: before "spring" change "system,s" to "system's"

Signed and Sealed this

Fifth Day of February, 1991

*Attest:*

HARRY F. MANBECK, JR.

*Attesting Officer*  *Commissioner of Patents and Trademarks*